United States Patent
Wood et al.

(10) Patent No.: US 10,974,903 B2
(45) Date of Patent: Apr. 13, 2021

(54) CONVEYOR LIFTING DEVICE

(71) Applicant: Joy Global Underground Mining LLC, Warrendale, PA (US)

(72) Inventors: Travers Wood, Springfield (AU); Simon Vant, Terrigal (AU); Ryan Hubble, Woongarrah (AU)

(73) Assignee: JOY GLOBAL CONVEYORS INC, Winfield, AL (US)

( * ) Notice: Subject to any disclaimer, the term of this patent is extended or adjusted under 35 U.S.C. 154(b) by 0 days.

(21) Appl. No.: 16/557,616

(22) Filed: Aug. 30, 2019

(65) Prior Publication Data

US 2020/0071080 A1 Mar. 5, 2020

Related U.S. Application Data

(60) Provisional application No. 62/725,091, filed on Aug. 30, 2018.

(51) Int. Cl.
| | |
|---|---|
| *B65G 15/08* | (2006.01) |
| *B65G 15/60* | (2006.01) |
| *B65G 21/06* | (2006.01) |
| *B65G 21/10* | (2006.01) |
| *B65G 39/12* | (2006.01) |

(52) U.S. Cl.
CPC ............. *B65G 15/08* (2013.01); *B65G 15/60* (2013.01); *B65G 21/06* (2013.01); *B65G 21/10* (2013.01); *B65G 39/12* (2013.01); *B65G 2201/04* (2013.01)

(58) Field of Classification Search
CPC ........ B65G 15/08; B65G 15/46; B65G 15/60; B65G 21/06; B65G 21/10; B65G 39/12; B65G 39/125; B65G 2201/04; B65G 21/08; B65G 65/10
See application file for complete search history.

(56) References Cited

U.S. PATENT DOCUMENTS

| | | | |
|---|---|---|---|
| 3,101,192 A * | 8/1963 | Stinson | ................. B65G 21/06 254/256 |
| 5,207,551 A | 5/1993 | Yelton | |
| 5,680,925 A * | 10/1997 | Gallagher | ............. B65G 15/00 198/861.1 |
| 6,044,960 A | 4/2000 | Cloud et al. | |
| 6,109,428 A | 8/2000 | Harm | |
| 6,244,428 B1 | 6/2001 | Atkins | |
| 8,186,651 B2 | 5/2012 | Dowling | |
| 9,428,372 B2 | 8/2016 | Arif | |
| 9,771,799 B2 | 9/2017 | de Lore et al. | |

(Continued)

OTHER PUBLICATIONS

International Search Report and Written Opinion for Application No. PCT/US2019/049172 dated Nov. 8, 2019 (14 pages).

*Primary Examiner* — Gene O Crawford
*Assistant Examiner* — Keith R Campbell
(74) *Attorney, Agent, or Firm* — Michael Best & Friedrich LLP

(57) ABSTRACT

A device for separating a conveying member from a support structure includes an elongated member for engaging a portion of the conveying member, and a lever. The elongated member includes a first end and a second end. The lever is coupled to at least one end of the elongated member, and the lever includes a base end and a distal end. The lever is pivotable between a first position in which the elongated member is lowered and a second position in which the elongated member is elevated.

18 Claims, 11 Drawing Sheets

(56) References Cited

U.S. PATENT DOCUMENTS

| | | |
|---|---|---|
| 9,856,088 B1 | 1/2018 | Riggs |
| 10,071,860 B2 * | 9/2018 | Kahrger .................. B65G 39/00 |
| 2008/0060909 A1 | 3/2008 | DeVries |
| 2020/0024089 A1 * | 1/2020 | Brunone ................. B65G 15/00 |

* cited by examiner

CONVEYOR LIFTING DEVICE

REFERENCE TO RELATED APPLICATION

This application claims the benefit of prior-filed U.S. Provisional Patent Application No. 62/725,091, filed Aug. 30, 2018, the entire contents of which are incorporated by reference.

BACKGROUND

The present disclosure relates to conveyor systems, and particularly to a lifting device for a conveyor belt.

Conveyor systems are used in a variety of applications. For example, mining systems typically include one or more conveyor systems for transporting cut material. The conveyor system includes a conveyor belt and a support structure for supporting the belt. The support structure includes multiple idler rollers, and each idler roller typically includes a shell that is rotatable about a shaft. The shell may rotate about the shaft as the belt contacts and moves over an outer surface of the shell.

SUMMARY

In one independent aspect, a device for separating a conveying member from a support structure includes an elongated member for engaging a portion of the conveying member, and a lever. The elongated member includes a first end and a second end. The lever is coupled to at least one end of the elongated member, and the lever includes a base end and a distal end. The lever is pivotable between a first position in which the elongated member is lowered and a second position in which the elongated member is elevated.

In some aspects, the elongated member is configured to be positioned below the conveying member and to extend across a width of the conveying member. While the lever is in the second position the elongated member is in an elevated position.

In some aspects, the first end of the elongated member is configured to be supported by a first side of the support structure, and the second end of the elongated member is configured to be supported relative to a second side of the support structure.

In some aspects, the second end of the elongated member is coupled to the lever in an over-center configuration. When the lever is in one of the first position and the second position, the lever is biased against movement toward the other of the first position and the second position.

In some aspects, a force exerted on the elongated member at least partially biases the lever against movement toward the other of the first position and the second position.

In some aspects, the device further includes a retainer for engaging the lever and securing the lever against movement while the lever is in the second position.

In some aspects, the base end is configured to be pivotably coupled to the support structure, and the lever further including a joint positioned between the base end and the distal end. A line of action of a force exerted on the lever by the elongated member passes through the joint.

In some aspects, the device further includes a link pivotably coupled between the second end of the flexible member and the joint of the lever.

In another independent aspect, a device for separating a conveying member from a support structure includes an elongated member for engaging a portion of the conveying member, and a lever pivotable between a first position and a second position. The elongated member includes a first end and a second end. While the lever is in the first position, the portion of the conveying member is supported by the support structure, and while the lever is in the second position, the portion of the conveying member is supported by the elongated member away from the support structure.

In some aspects, the elongated member is configured to be positioned below the conveying member and extend across a width of the conveying member. While the lever is in the second position the elongated member is in an elevated position.

In some aspects, the first end of the elongated member is configured to be supported by a first side of the support structure, and the second end of the elongated member is configured to be supported by a second side of the support structure.

In some aspects, the second end of the elongated member is coupled to the lever in an over-center configuration. When the lever is in one of the first position and the second position, the lever is biased against movement toward the other of the first position and the second position.

In some aspects, a force exerted on the elongated member at least partially biases the lever against movement toward the other of the first position and the second position.

In some aspects, the device further includes a retainer for engaging the lever and securing the lever against movement while the lever is in the second position.

In some aspects, the lever includes a base end and a distal end. The base end is configured to be pivotably coupled to the support structure. The lever further includes a joint positioned between the base end and the distal end. A line of action of a force exerted on the lever by the elongated member passes through the joint.

In yet another independent aspect, a conveyor structure for supporting a conveying member includes a frame and a lifting tool. The frame includes a first side, a second side, and at least one roller positioned between the first side and the second side. The roller is configured to support a portion of the conveying member as the portion of the conveying member passes between the first side and the second side. The lifting tool selectively supports the portion of the conveying member away from the roller. The lifting tool includes an elongated member for engaging the portion of the conveying member, and a lever. The elongated member includes a first end supported relative to the first side and a second end supported relative to the second side. The lever is coupled to at least one of the first end and the second end of the elongated member. The lever is pivotable between a first position and a second position. While the lever is in the first position the at least one roller at least partially supports the portion of the conveying member. While the lever is in the second position the elongated member supports the portion of the conveying member away from the roller.

In some aspects, the elongated member is positioned substantially between the portion of the conveying member and the roller, the elongated member extending across a width of the conveying member.

In some aspects, the second end of the elongated member is coupled to the lever in an over-center configuration. When the lever is in one of the first position and the second position, the lever is biased against movement toward the other of the first position and the second position.

In some aspects, the lifting tool further includes a retainer for engaging the lever and securing the lever against movement while the lever is in the second position.

In some aspects, the lever includes a base end and a distal end. The base end is pivotably coupled to the first side. The lever further includes a joint positioned between the base end and the distal end. A line of action of a force exerted on the lever by the elongated member passes through the joint.

Other aspects will become apparent by consideration of the detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1:
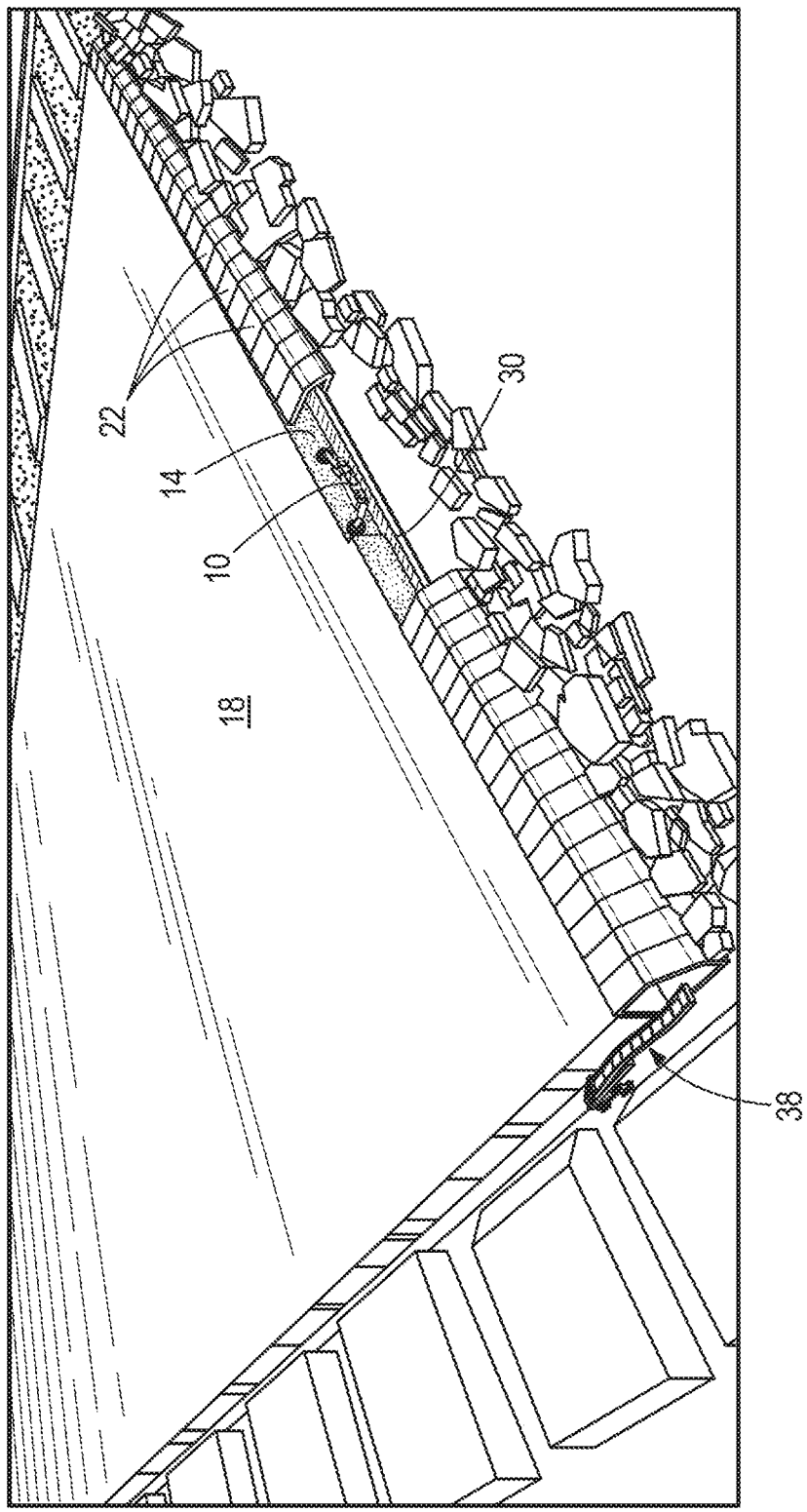
FIG. 1 is a perspective view of a mining operation.
Figure 2:
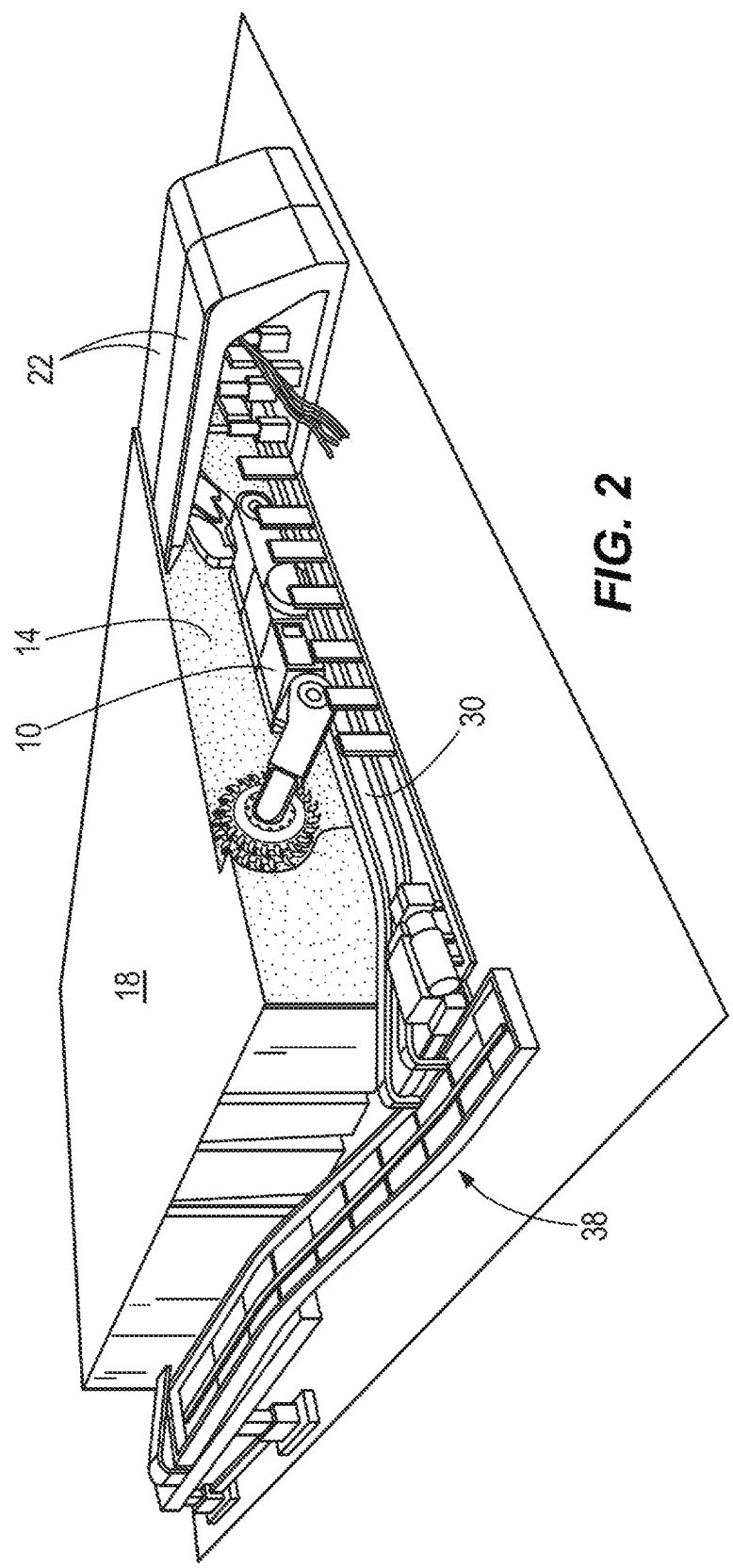
FIG. 2 is an enlarged perspective view of the mining operation of FIG. 1.

Conveyor systems may be used in a variety of applications. For example, FIGS. 1 and 2 illustrate a longwall underground mining operation in which a mining machine excavates material from a mine face 14 of a mineral seam 18 and progresses through the seam 18 as material is removed. In the illustrated embodiment, the mining machine 10 is a conventional longwall shearer, and the structure and operation of the shearer may be readily understood by a person of ordinary skill in the art. Roof supports 22 are aligned in a row along the length of the mine face 14 to provide protection (a portion of the roof supports 22 are removed in FIGS. 1 and 2 to illustrate the mining machine 10 and the mine face 14). In other embodiments, a different type of mining machine and/or operation may be used. After the shearer 10 removes material from the mine face 14, the material is directed onto a face conveyor 30, which conveys the material generally parallel to the mine face 14. The material is then deposited on a beam stage loader 38, which may be positioned proximate an end of the face 14.

Figure 3:
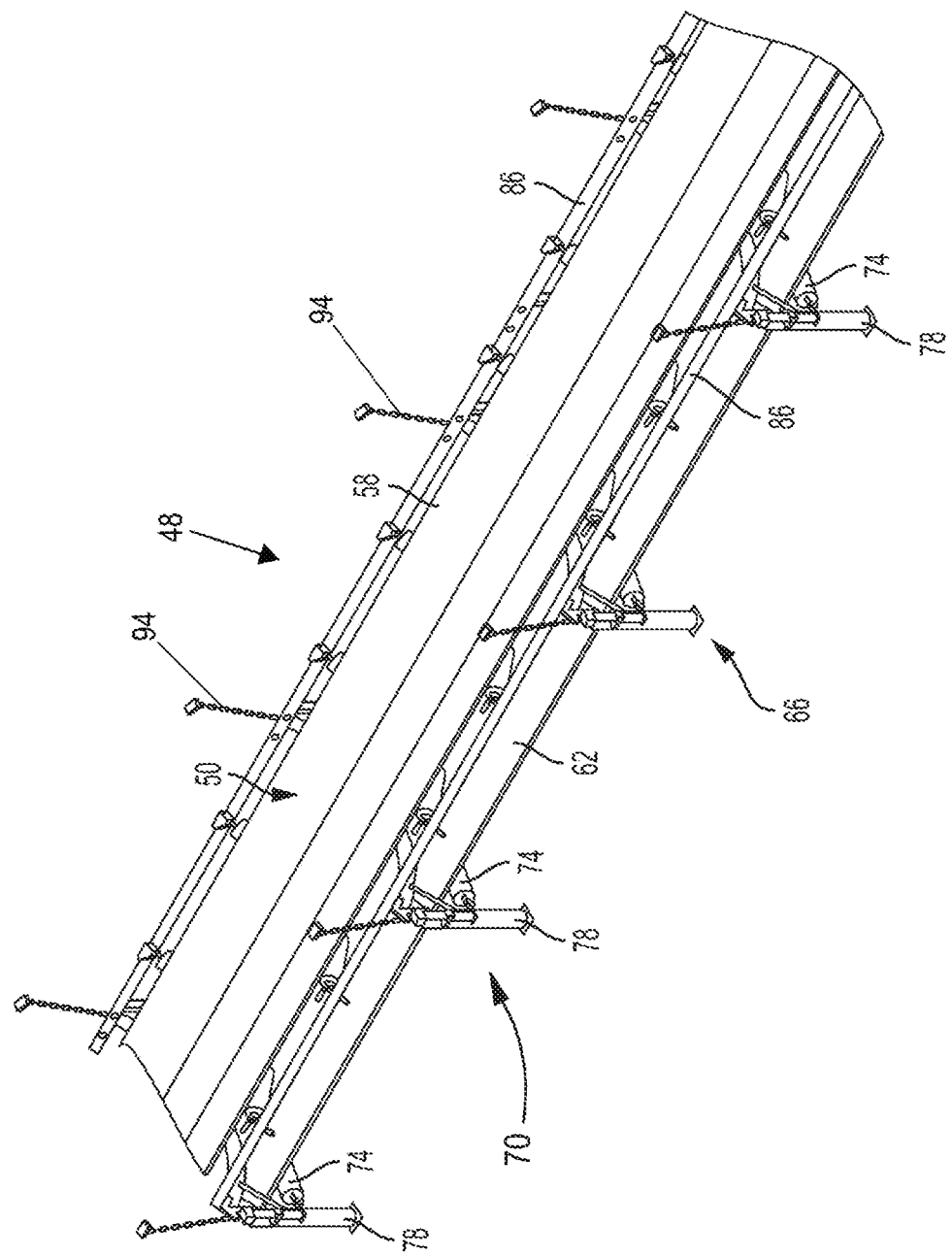
FIG. 3 is a perspective view of a portion of a conveyor system.

From the boot stage loader 38, the material may be transferred to a main conveyor 48. As shown in FIG. 3, the main conveyor 48 includes a conveyor belt 50 and a support structure 66. In the illustrated embodiment, the conveyor belt 50 includes a first or upper run 58 and a second or lower run 62, and the upper run 58 carries cut material (not shown). Also, in the illustrated embodiment, the support structure 66 includes multiple sections. Each section of the support structure 66 includes a support frame 70 and idler rollers 74. The belt 50 moves over an outer surface of the idler rollers 74.

Figure 4A:
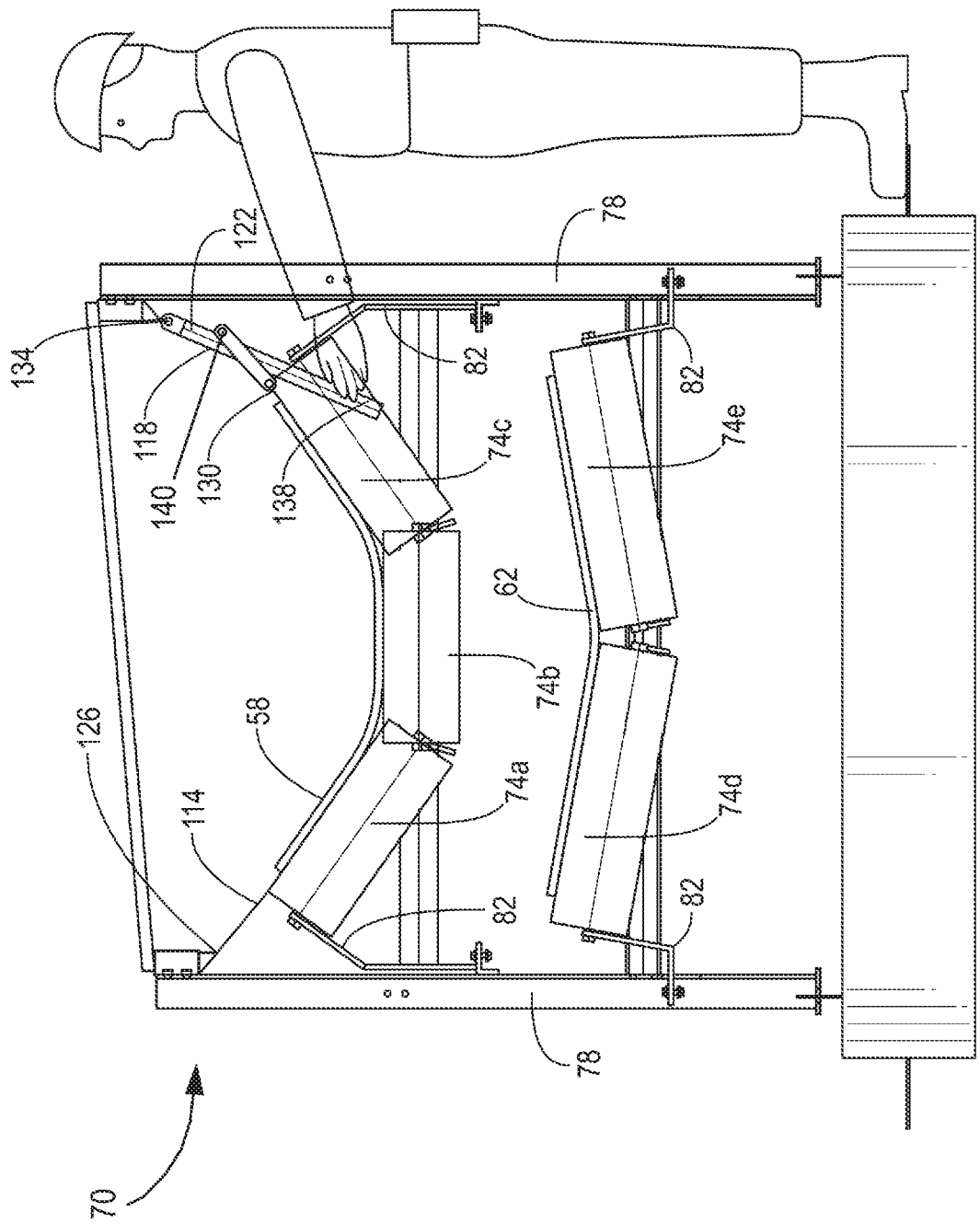
FIG. 4A is an end elevation view of a conveyor system with a belt lifting device in a first position.
Figure 4B:
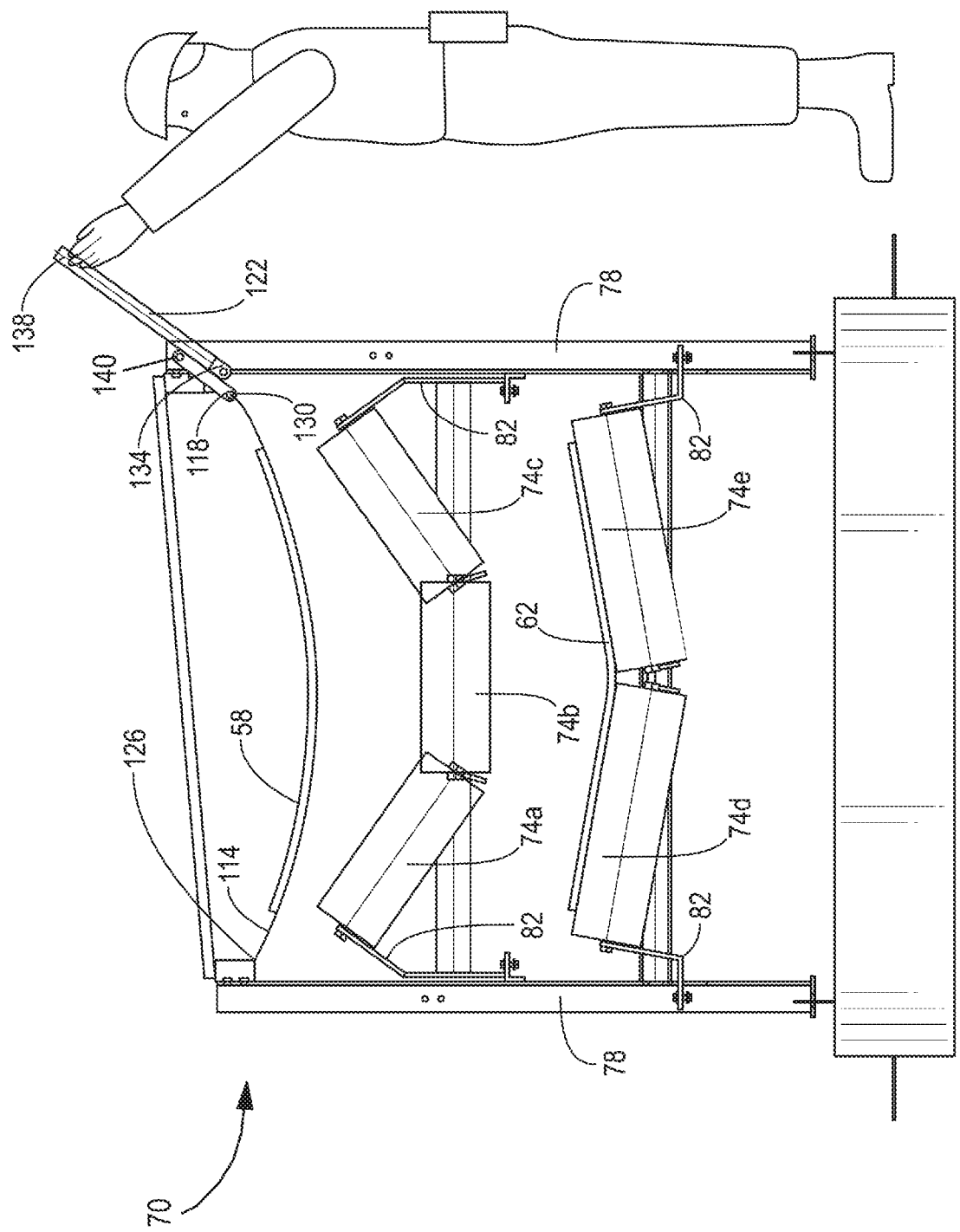
FIG. 4B is an end elevation view of the conveyor system of FIG. 4A with the belt lifting device in a second position.

In the illustrated embodiment shown in FIGS. 4A and 4B, the support frame 70 includes a pair of sides or side portions, and the rollers 74 extend laterally between the sides to support the portion of the conveyor belt 50 as it passes through the frame 70 and between the sides. In the illustrated embodiment, the frame 70 includes a leg 78 positioned on each side. The legs may extend above the rollers 74. In some embodiments, the conveyor support structure 66 includes rails 86 (FIG. 3) extending between adjacent frames 70, and the idler rollers 74 may be supported by the rails 86. Also, in some embodiments, the rails 86 are stringer rails and are supported from above, e.g., by stringers or chains 94 (FIG. 3) suspended from a mine roof (not shown).

In the illustrated embodiment, the upper run 58 is supported by three rollers 74 positioned end to end laterally between the legs 78, with a center roller 74b positioned between end rollers 74a, 74c. The end rollers 74a, 74c are coupled to the legs 78 (e.g., by brackets 82) and are angled downwardly toward the center roller 74b to form a trough or U-shaped profile. The lower run 62 is supported by two rollers 74d, 74e positioned end to end laterally between the legs 78, and the two rollers 74d, 74e are coupled to the legs 78 (e.g., by brackets 82) and are angled downwardly toward a centerline of the conveyor to form a V-shape. In other embodiments, the lower run may be supported by three rollers. In other embodiments, each run 58, 62 may be supported by fewer or more rollers than shown in FIGS. 4A and 4B.

Referring again to FIGS. 4A, 4B, and 5, a belt lifting device 110 includes an elongated member, such as a strap 114. The lifting device further includes a lever or arm 122. The strap 114 can be positioned between the conveyor belt and the rollers 74 to be serviced. In the illustrated embodiment, the strap 114 is positioned between the upper run 58 and the upper rollers 74a-c. Also, in the illustrated embodiment a first end 126 of the strap 114 is secured to one of the sides of the frame 70, and a second end 130 of the strap 114 is coupled to the arm 122. Furthermore, in the illustrated embodiment the lifting device 110 includes a link 118 coupled between the second end 130 of the strap 114 and the arm 122.

The arm 122 includes a first or base end 134 pivotably coupled to another side of the frame 70 (e.g., the leg opposite the leg to which the first end 126 of the strap 114 is secured), and the arm 122 includes a second or distal end 138 opposite the base end 134. The base end 134 of the arm 122 may be secured against translational movement relative to the side of the frame 70 (e.g., one of the legs 78). The arm 122 is capable of pivoting movement about the base end 134. In addition, the arm 122 includes a joint 140. In the illustrated embodiment, the joint 140 is positioned substantially between the base end 134 and the distal end 138. The second end 130 of the strap 114 is coupled to the arm 122 at the joint 140 (for example, by the link 118).

Figure 7:
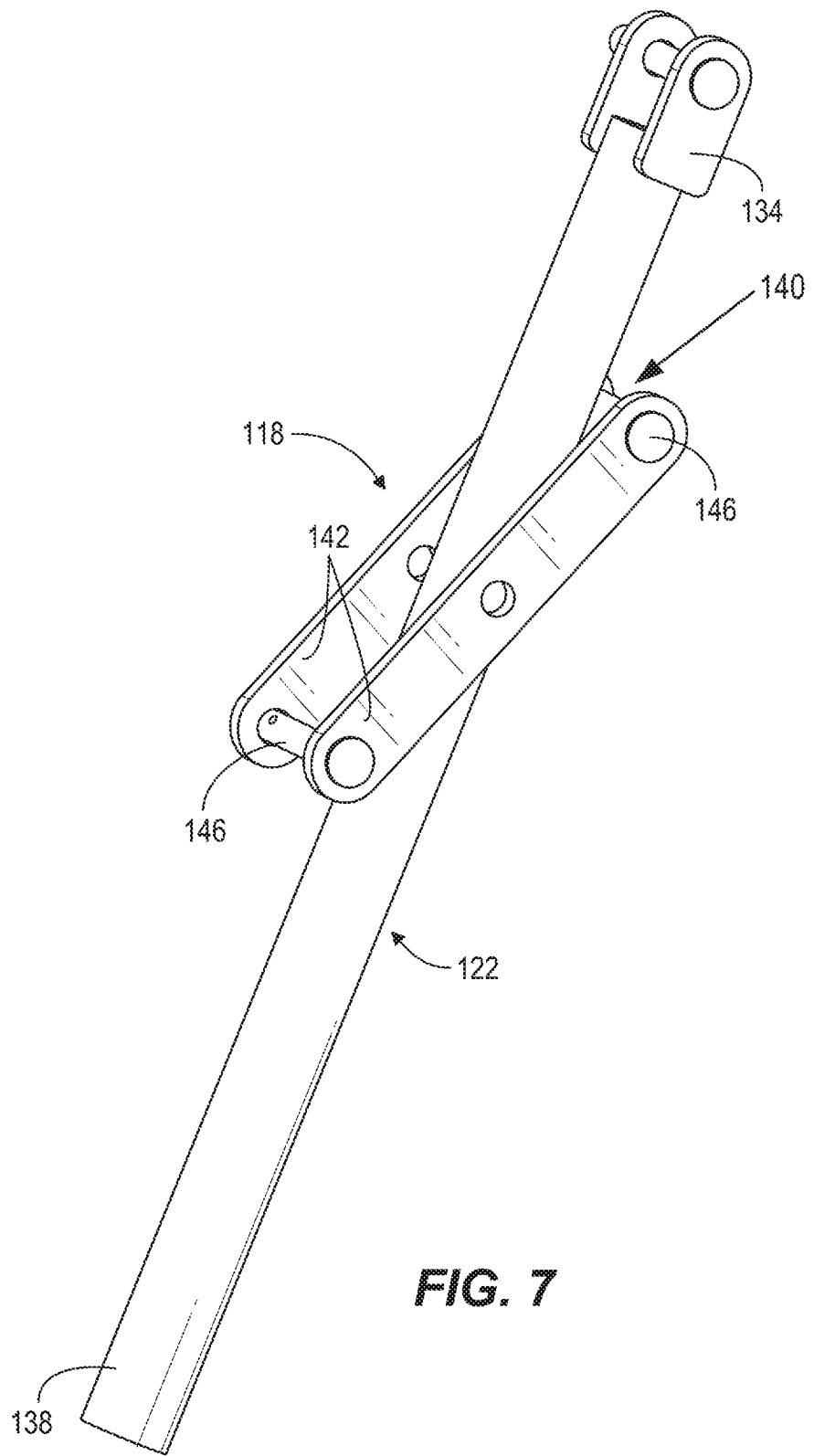
FIG. 7 is a perspective view of the arm and the link of the belt lifting device of FIG. 4A in the first position.
Figure 8:
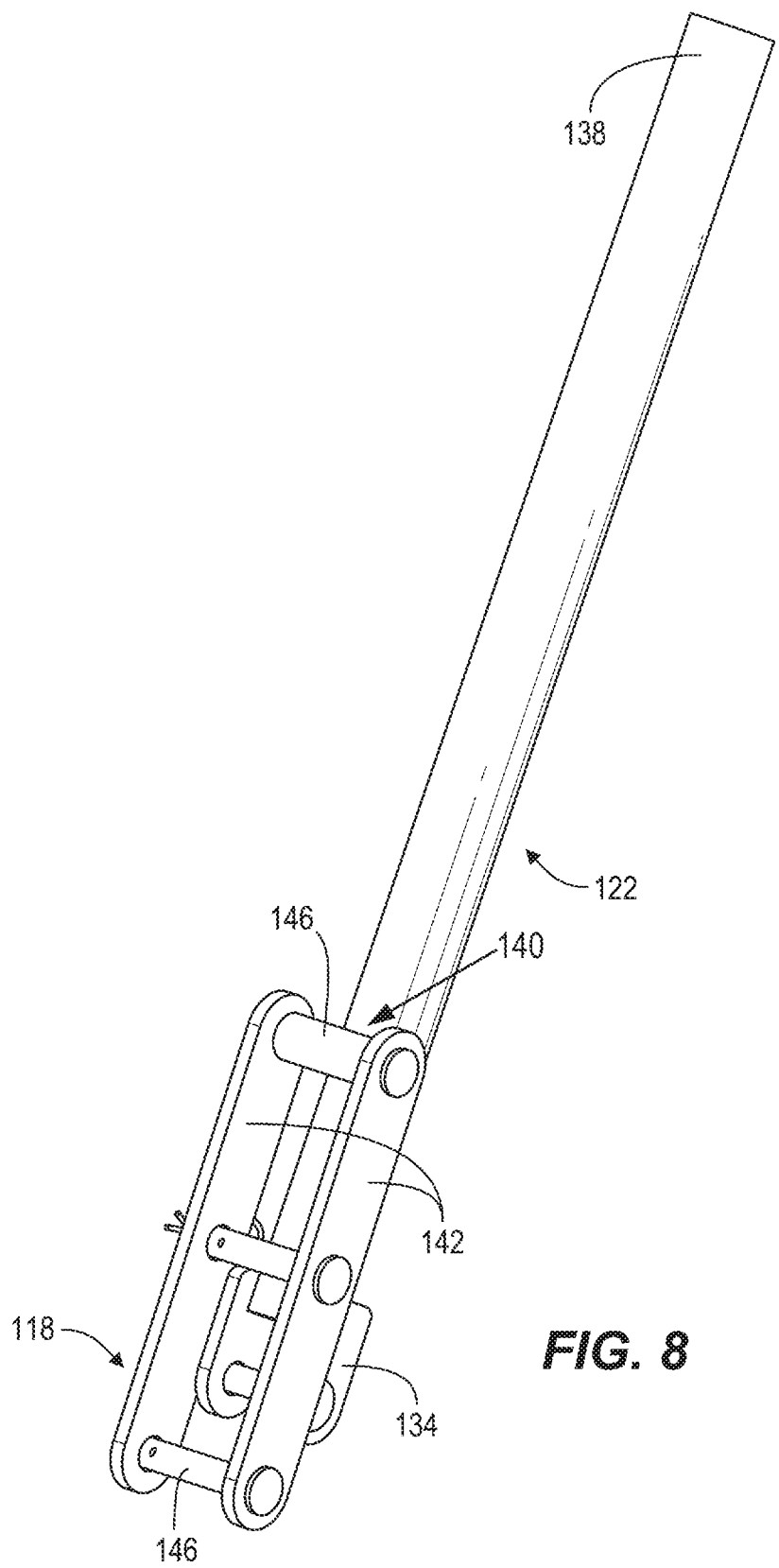
FIG. 8 is a perspective view of the arm and the link of the belt lifting device of FIG. 4B in the second position.

As shown in FIGS. 7 and 8, in the illustrated embodiment the link 118 includes a pair of parallel plates 142 connected together by pins 146. The arm 122 is positioned between the plates 142 and can pass at least partially between the pins 146. The plates 142 of the link 118 may be positioned on either side of the arm 122 and are coupled to the arm 122 at a position between the base end 134 and the distal end 138 (e.g., the joint 140), and rotation of the arm 122 about its base end 134 causes the arm 122 to engage pins 146 and move the link 118.

Figure 5:
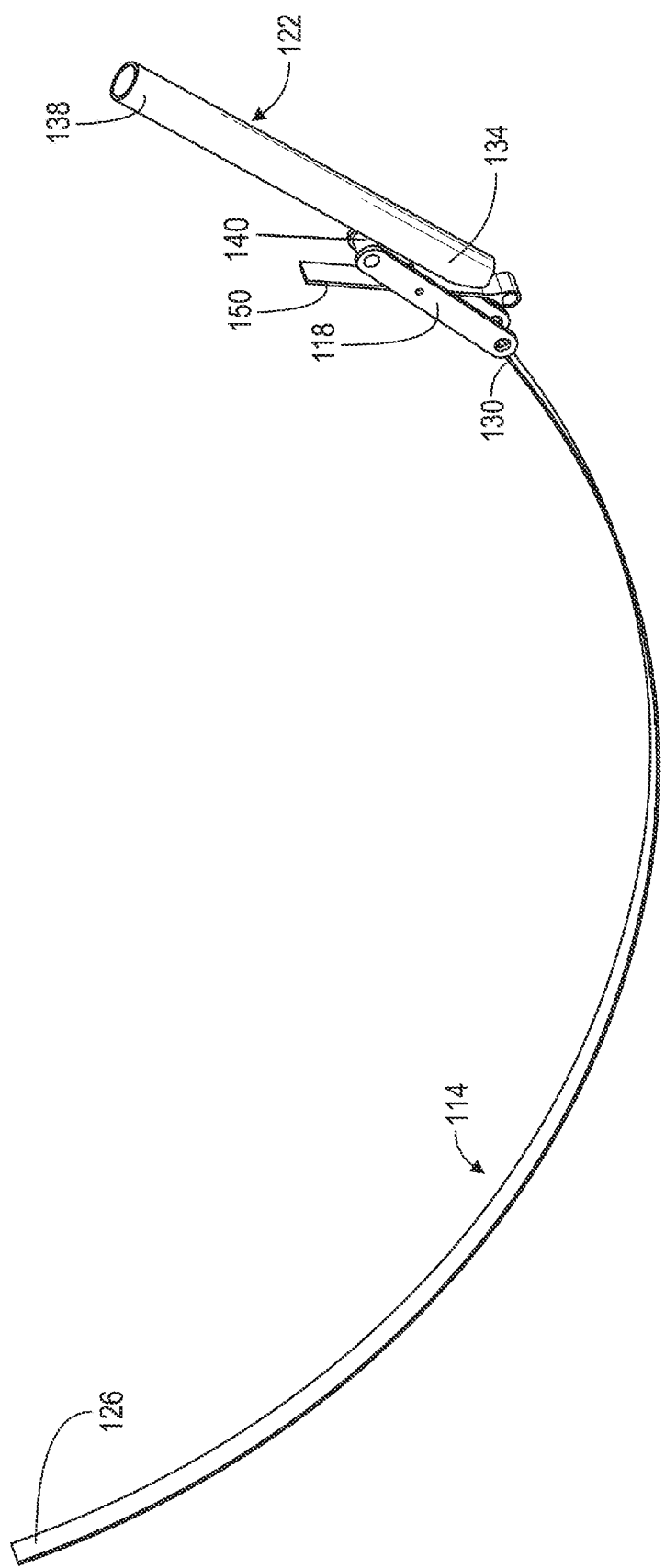
FIG. 5 is a perspective view of the belt lifting device of FIG. 4B in the second position.

The belt lifting device 110 can be actuated between a first or relaxed position (FIG. 4A) and a second or elevated position (FIGS. 4B and 5). In the relaxed position, the strap 114 is positioned against the rollers 74a-c. In the elevated position, the strap 114 is elevated or raised to separate the belt 58 from the rollers 74a-c.

Figure 6:
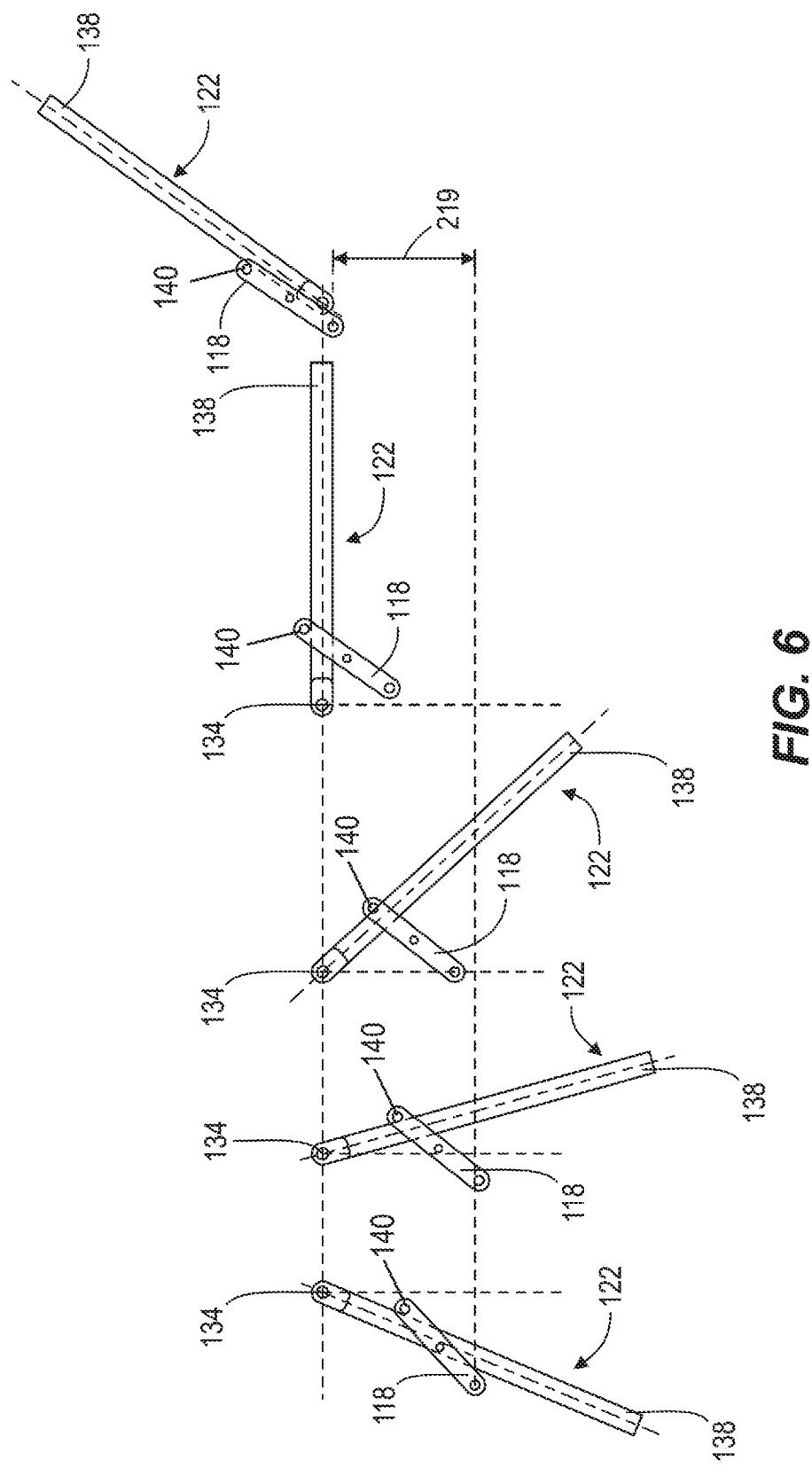
FIG. 6 is an end view of an arm and a link of the belt lifting device of FIG. 4A in multiple positions.

As shown in FIG. 6, the arm 122 is pivotable about its base end 134 to raise the second end 130 of the strap 114 (e.g., by the link 118). In the illustrated embodiment, an operator or technician may grasp the arm 122 near the distal end 138 and rotate it (e.g., counter-clockwise as shown in FIG. 6). The rotation of the arm 122 raises the second end 130 of the strap 114 (for example, by raising the end of the link 118 that is coupled to the strap 114). In addition, the arm 122 can be rotated past a point at which the weight of the belt 58 would cause the arm 122 to fall back toward the relaxed position. That is, when the arm 122 is in the elevated position, a force (such as the weight of the belt 58) is exerted (e.g., through the link 118) on the arm 122 and is oriented to pull the arm 122 against side of the frame 70 (see FIGS. 4B and 5, and far right image in FIG. 6). Stated another way, the rotation of the arm 122 causes the point (e.g., the joint 140) at which the force (e.g., the weight of the belt 58) is exerted on the arm 122 to pass through the line of action of the force, thereby causing the arm 122 and the strap 114 to operate in an over-center or toggle configuration. As a result, the force exerted on the arm 122 biases the arm 122 against movement, biasing the arm 122 to remain locked in the second position to keep the strap 114 elevated while an operator/technician services the frame 70 and/or rollers 74.

In some embodiments, a retainer 150 (FIG. 5) can be positioned to engage the link 118 and/or the arm 122 to positively lock the arm 122 in the elevated position. In the illustrated embodiment, the retainer 150 passes between the plates 142 of the link 118 while the arm 122 is in the elevated position.

Unlike conventional jacks/lifting devices, the belt lifting device 110 is relatively lightweight and can be carried to the site where service is required. The belt lifting device 110 also supports the belt 50 in its natural shape, and avoids supporting the belt 50 with metal arms. The belt lifting device 110 takes advantage of the leverage of the link 118 and the arm 122 and permits a user to manually elevate the belt 50. The belt lifting device 110 can be anchored to the existing support structure.

Figure 9:
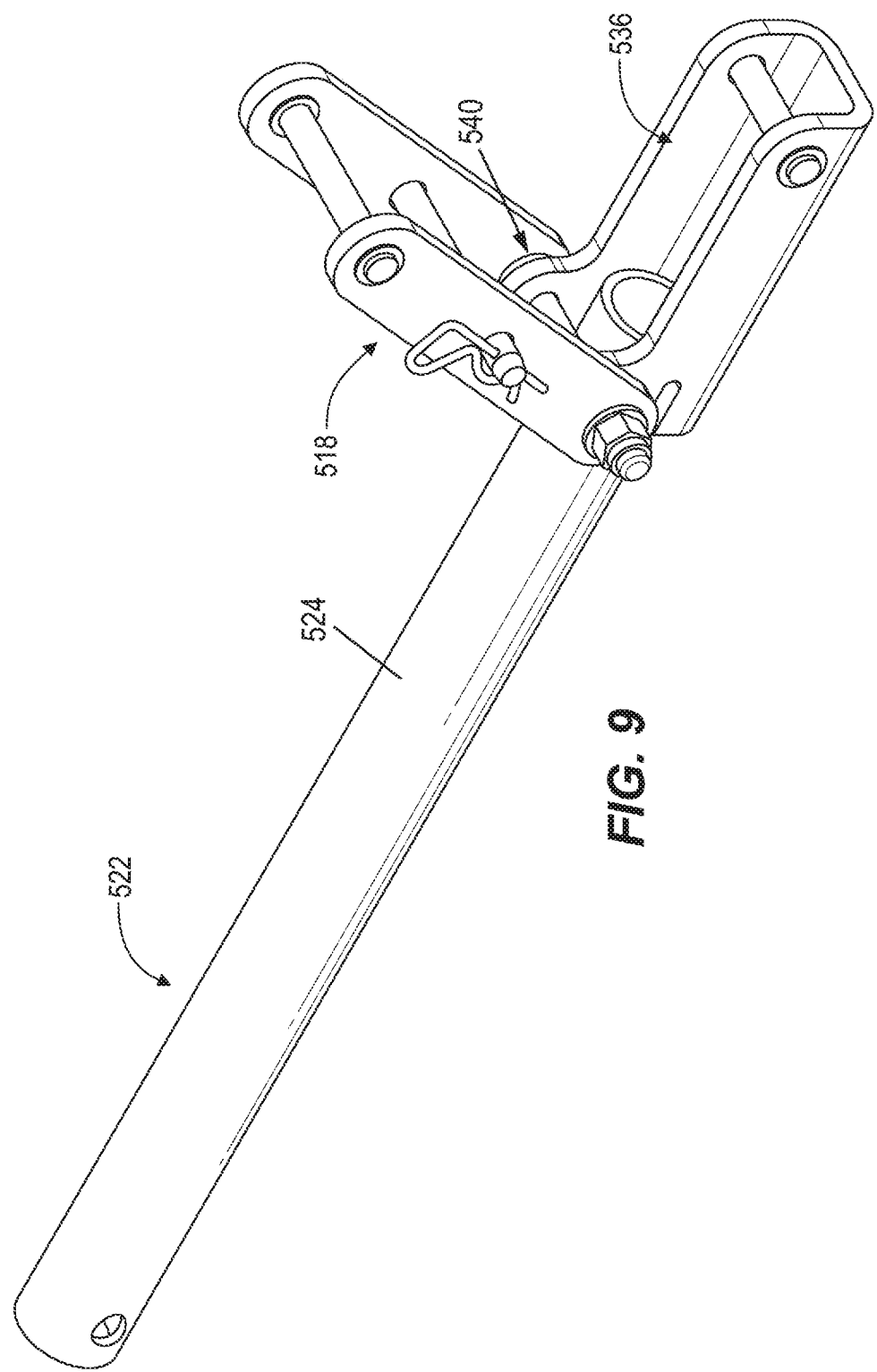
FIG. 9 is a perspective view of an arm and a link of a belt lifting device according to another embodiment.
Figure 10:
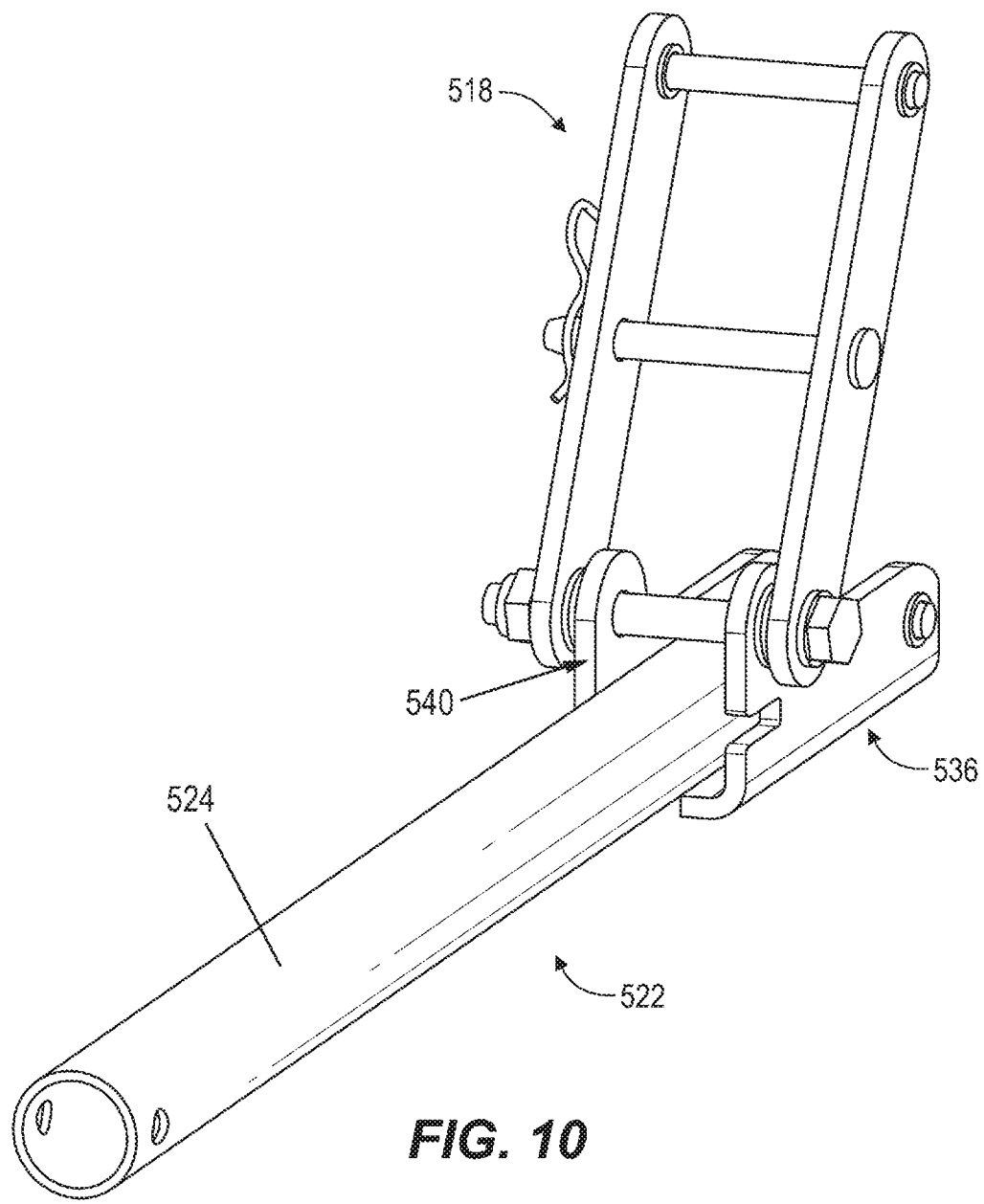
FIG. 10 is another perspective view of the arm and the link of the belt lifting device of FIG. 9.

FIGS. 9 and 10 illustrate an arm 522 according to another embodiment. The lever or arm 522 includes a shaft 524 and an end bracket 536 secured to an end of the shaft 524. The joint 540 is positioned on the end bracket 536, and a link 518 is pivotably coupled to the end bracket 536.

Although aspects of the conveyor system have been described above in the context of an underground mining operation, it is understood that the disclosure is not limited to this context. The aspects described above may be applied to trough belt conveyors and other types of conveyors, and/or may be applied to conveyors in underground mining, surface mining, hard rock mining, industrial, manufacturing, agriculture, and other contexts.

Although aspects have been described in detail with reference to certain preferred embodiments, variations and modifications exist within the scope and spirit of one or more independent aspects as described.

What is claimed is:

1. A device for separating a conveying member from a support structure, the device comprising:
   an elongated member for engaging a portion of the conveying member, the elongated member including a first end and a second end; and
   a lever coupled to at least one end of the elongated member, the lever including a base end configured to be pivotably coupled to the support structure, a distal end, and a joint positioned between the base end and the distal end, the lever pivotable between a first position in which the elongated member is lowered and a second position in which the elongated member is elevated, and a line of action of a force exerted on the lever by the elongated member passes through the joint as the lever is pivoted between the first position and the second position.

2. The device of claim 1, wherein the elongated member is configured to be positioned below the conveying member and to extend across a width of the conveying member, wherein while the lever is in the second position the elongated member is in an elevated position.

3. The device of claim 1, wherein the first end of the elongated member is configured to be supported by a first side of the support structure, and the second end of the elongated member is configured to be supported relative to a second side of the support structure.

4. The device of claim 1, wherein the second end of the elongated member is coupled to the lever in an over-center configuration, wherein, when the lever is in one of the first position and the second position, the lever is biased against movement toward the other of the first position and the second position.

5. The device of claim 4, wherein a force exerted on the elongated member at least partially biases the lever against movement toward the other of the first position and the second position.

6. The device of claim 1, further comprising a retainer for engaging the lever and securing the lever against movement while the lever is in the second position.

7. The device of claim 1, further comprising a link pivotably coupled between the second end of the elongated member and the joint of the lever.

8. A device for separating a conveying member from a support structure, the device comprising:
   an elongated member for engaging a portion of the conveying member, the elongated member including a first end and a second end; and
   a lever coupled to the second end of the elongated member in an over-center configuration, the lever pivotable between a first position and a second position, while the lever is in the first position, the portion of the conveying member is supported by the support structure, and while the lever is in the second position, the portion of the conveying member is supported by the elongated member away from the support structure, while the lever is in one of the first position and the second position, the lever is biased against movement toward the other of the first position and the second position at least partially by the weight of the conveying member.

9. The device of claim 8, wherein the elongated member is configured to be positioned below the conveying member and extend across a width of the conveying member, wherein while the lever is in the second position the elongated member is in an elevated position.

10. The device of claim 8, wherein the first end of the elongated member is configured to be supported by a first side of the support structure, and the second end of the elongated member is configured to be supported by a second side of the support structure.

11. The device of claim 8, wherein a force exerted on the elongated member at least partially biases the lever against movement toward the other of the first position and the second position.

12. The device of claim 8, further comprising a retainer for engaging the lever and securing the lever against movement while the lever is in the second position.

13. The device of claim 8, wherein the lever includes a base end and a distal end, the base end configured to be pivotably coupled to the support structure, the lever further including a joint positioned between the base end and the distal end, wherein a line of action of a force exerted on the lever by the elongated member passes through the joint.

14. A conveyor structure for supporting a conveying member, the conveyor structure comprising:
 a frame including a first side, a second side, and at least one roller positioned between the first side and the second side, the roller configured to support a portion of the conveying member as the portion of the conveying member passes between the first side and the second side; and
 a lifting tool for selectively supporting a portion of the conveying member away from the roller, the lifting tool including,
  an elongated member for engaging a portion of the conveying member, the elongated member including a first end secured against translational movement relative to the first side and a second end supported for movement relative to the second side, and
  a lever coupled to at least one of the first end and the second end of the elongated member, the lever pivotable between a first position and a second position, while the lever is in the first position the at least one roller at least partially supports the portion of the conveying member, while the lever is in the second position the elongated member supports the portion of the conveying member away from the roller.

15. The conveyor structure of claim 14, wherein the elongated member is positioned substantially between the portion of the conveying member and the roller, the elongated member extending across a width of the conveying member.

16. The conveyor structure of claim 14, wherein the second end of the elongated member is coupled to the lever in an over-center configuration, wherein, when the lever is in one of the first position and the second position, the lever is biased against movement toward the other of the first position and the second position.

17. The conveyor structure of claim 14, wherein the lifting tool further includes a retainer for engaging the lever and securing the lever against movement while the lever is in the second position.

18. The conveyor structure of claim 14, wherein the lever includes a base end and a distal end, the base end pivotably coupled to the first side, the lever further including a joint positioned between the base end and the distal end, wherein a line of action of a force exerted on the lever by the elongated member passes through the joint.

* * * * *